(12) United States Patent
Li et al.

(10) Patent No.: US 9,457,342 B2
(45) Date of Patent: Oct. 4, 2016

(54) MULTI-METALLIC BULK CATALYST WITH LAYERED STRUCTURE AND METHOD FOR THE PREPARATION AND USE THEREOF

(75) Inventors: Can Li, Dalian (CN); Zongxuan Jiang, Dalian (CN); Lu Wang, Dalian (CN); Yongna Zhang, Dalian (CN); Yuliang Zhang, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 1280 days.

(21) Appl. No.: 13/202,517

(22) PCT Filed: May 4, 2010

(86) PCT No.: PCT/CN2010/000626
§ 371 (c)(1),
(2), (4) Date: Oct. 26, 2011

(87) PCT Pub. No.: WO2011/075928
PCT Pub. Date: Jun. 30, 2011

(65) Prior Publication Data
US 2012/0037541 A1    Feb. 16, 2012

(30) Foreign Application Priority Data

Dec. 23, 2009  (CN) .......................... 2009 1 0259499

(51) Int. Cl.
*C01G 29/00*  (2006.01)
*B01J 21/02*  (2006.01)
(Continued)

(52) U.S. Cl.
CPC ............. *B01J 23/755* (2013.01); *B01J 23/002* (2013.01); *B01J 23/8885* (2013.01);
(Continued)

(58) Field of Classification Search
CPC .... B01J 23/002; B01J 23/85; B01J 23/8885; B01J 35/002; B01J 37/03; B01J 2523/00; B01J 2523/68; B01J 2523/69; B01J 2523/847; C10G 2300/202; C10G 2300/207; C10G 2300/1055; C10G 2300/4081
See application file for complete search history.

(56) References Cited

U.S. PATENT DOCUMENTS 6,783,663 B1 * 8/2004 Riley et al. .................. 208/213
6,800,578 B2 * 10/2004 Stamires ................ B01J 23/007
423/600

(Continued)

FOREIGN PATENT DOCUMENTS

CN    1339985    3/2002
CN    1660487    8/2005
(Continued)

OTHER PUBLICATIONS

Wang et al, Hydrodesulfurization of 4,6-DMDBT on a multi-metallic sulfide catalyst with layered structure, Applied Catalysis A: General 394 (2011): 18-24.*
(Continued)

*Primary Examiner* — Jun Li
(74) *Attorney, Agent, or Firm* — Enshan Hong; VLP Law Group LLP

(57) ABSTRACT

The invention discloses a multi-metallic bulk catalyst with layered structure, wherein the metals in the multi-metallic bulk catalyst is consisted of a Group VIII metal $M_I$, at least one metal $M_{II}$ with the valence of +3 and at least two Group VIB metals $M_{III}+M_{IV}$, wherein (the mole number of $M_I$+the mole number of $M_{II}$):(the mole number of $M_{III}$+the mole number of $M_{IV}$) is from 1:9 to 9:1; the mole number of $M_I$:the mole number of $M_{II}$ is from 1:5 to 5:1; and the mole number of $M_{III}$:the mole number of $M_{IV}$ is from 1:5 to 5:1. The invention also discloses the preparation method and use of the above catalyst. The invention is use for the hydrodesulfurization of diesel distillate including 4,6-dimethyldibenzothiophene, wherein the catalyst exhibits a extreme high hydrodesulfurization activity. Thus, the ultra-deep hydrodesulfurization is achieved and the cost of the bulk catalyst is reduced.

9 Claims, 3 Drawing Sheets

(a)

(b)

(51) Int. Cl.
  *B01J 23/888* (2006.01)
  *B01J 35/02* (2006.01)
  *B01J 37/08* (2006.01)
  *B01J 23/755* (2006.01)
  *B01J 23/00* (2006.01)
  *B01J 37/02* (2006.01)
  *B01J 37/04* (2006.01)
  *B01J 37/20* (2006.01)
  *C10G 45/04* (2006.01)

(52) U.S. Cl.
  CPC ........... *B01J 37/0236* (2013.01); *B01J 37/04* (2013.01); *B01J 37/088* (2013.01); *B01J 37/20* (2013.01); *C10G 45/04* (2013.01); *C10G 2300/202* (2013.01); *C10G 2300/207* (2013.01); *C10G 2300/4018* (2013.01); *C10G 2300/70* (2013.01)

(56) References Cited

U.S. PATENT DOCUMENTS

| 8,377,289 | B2* | 2/2013 | Li et al. ............. 208/217 |
| 2004/0182749 | A1 | 9/2004 | Domokos et al. | |
| 2006/0060503 | A1* | 3/2006 | Soled et al. ............. 208/111.3 |

FOREIGN PATENT DOCUMENTS

| CN | 101153228 | 4/2008 |
| CN | 101456074 | 6/2009 |
| CN | 101683624 | 3/2010 |
| JP | 2006334527 | 12/2006 |

OTHER PUBLICATIONS

Huirache-Acuna et al., Synthesis of Ni—Mo—W sulphide catalysts by ex situ decomposition of trimetallic precursors, Applied Catalysis A: General 304 (2006) 124-130.
Nava et al., Nickel=Molybdenum-Tungsten Sulphide catalysts prepared by in situ activation of tri-metallic (Ni—Mo—W) alkylthiomolybdotungstates, Catalysis Letters vol. 99, Nos. 1-2 (2005) 65-71.
Nava et al., Effect of phosphorus addition on unsupported Ni—Mo—W sulfide catalysts prepared by the in situ activation of nickel/tetramethylammonium thiomolybdotungstate, Applied Catalysis A: General 302 (2006) 177-184.
International Search Report dated Sep. 30, 2010.

* cited by examiner (a)

(b)

MULTI-METALLIC BULK CATALYST WITH LAYERED STRUCTURE AND METHOD FOR THE PREPARATION AND USE THEREOF

PRIORITY CLAIM

This is a U.S. national stage of application No. PCT/CN10/000626, filed on May 4, 2010. Priority is claimed on the following application: Chinese Application No.: 200910259499.7 filed on Dec. 23, 2009, the content of which is incorporated here by reference.

BACKGROUND OF THE INVENTION

1. Field of the Invention

This invention relates to a multi-metallic bulk catalyst with layered structure.

This invention also relates to a method for the preparation of the above catalyst.

This invention also relates to use of the above catalyst in ultra-deep hydrodesulfurization of sulfur-containing compounds.

2. Description of the Related Art

As the requirements of the environmental regulations in each country on the sulfur content in fuel oil is stringent increasely, and the high-sulfur crude oil is increased around the world year after year, the development of ultra-deep hydrodesulfurization catalysts with high performance has been a challenging subject worldwide. It is well-known that SOx from the burning of organic sulfur-containing compounds in fuel oils not only can cause acid rain, but also can poison irreversibly the three-way catalysts in the tail gas cleanup systems of engines. Therefore, it has been receiving much attention. For this reason, all countries in the world have enacted much more stringent sulfur specifications of diesel. China will implement the sulfur specifications equal to Europe IV emission standard (<50 ppm) in Jul. 1, 2010 (Big cities in China, such as Beijing and Shanghai, will advance two years to implement the standard).

Currently, the hydrodesulfurization catalysts commonly used in industry are $Co-Mo/Al_2O_3$, $Ni-Mo-P/Al_2O_3$, $Ni-W-B/Al_2O_3$, $Ni-Co-Mo/Al_2O_3$ and $Co-W/Al_2O_3$, and the like. However, as the standard defined for sulfur content is becoming much higher, the activities of these catalysts cannot meet the demand of ultra-deep desulfurization. Thus, there is an urgent need for improving the hydrodesulfurization activity for the catalyst. The adjustment of operation conditions and the use of a new reactor both need a big amount of investment cost. In comparison, the development of a new hydrodesulfurization catalyst based on the existing operating conditions which can be used in an existing production unit is a much more economical and feasible method.

The sulfur-containing compounds contained mainly in diesel are thiols, thioethers, thiophenes and derivatives thereof, benzothiophenes and derivatives thereof, dibenzothiophenes and derivatives thereof, in which 4,6-DMDBT is the most difficult sulfur—containing compound to be removed through hydrodesulfurization means. The hydrodesulfurization activity of a traditional supported catalyst is hard to be improved generally by a large margin because the support itself therein has only limited catalytic effect, wherein the catalytic activity could only be improved by increasing the contact area between the support and reactants or using the synergistic effect between the support and the active species. However, a multi-metallic bulk catalyst, in other words, an unsupported multi-metallic catalyst is a catalyst with very high hydrodesulfurization activity because it has different kinds of active species and much more active sites than those of the supported catalyst. Among other, a bulk catalyst having a metallic composition of NiMoW, reported in the recent references and patents, has attracted much more attention due to having extremely high hydrodesulfurization activity.

In the U.S. Pat. Nos. 6,299,760, 6,156,695, 6,783,663, 6,712,955 and 6,758,963 and the like, the preparation methods and uses of novel NiMoW bulk catalysts were reported. Moreover, such a novel NiMoW catalyst exhibits a hydrodesulfurization activity which is about 3 times higher than that of other commercial reference catalyst. In all the preparation processes of the catalysts, ammonia was used as a complexing agent which was complexed with raw material, $Ni^{2+}$, followed by a slowly heating, wherein the Nickel-ammonia complex was decomposed slowly to $Ni^{2+}$, which was reacted with molybdenum and tungsten in the solution to form a NiMoW catalyst precursor. Upon calcination and sulfidation, the NiMoW catalyst was formed. The preparation method had a disadvantage that the use of concentrated aqueous ammonia during the synthesis could cause pollution on the environment.

It was reported by G. Alonso-Nunez et. al, in references (Applied Catalysis A: General, 304 (2006), 124-130; Applied Catalysis A: General, 302 (2006) 177-184; Catalysis Letters, 99 (2005) 65-71) that a NiMoW catalyst was synthesized by using different materials and sulfidation reagents. The catalyst obtained via synthesis by them had a special scaly shape and may have a relatively high surface area. However, the production cost for the catalyst was increased because of the complex synthesis method they used and expensive starting materials. Thus, it was hard to realize the industrialization thereof.

In the Chinese Patent No. 1339985A, a preparation method and use of NiMoW catalyst was disclosed. In the patent, the catalyst was obtained by reacting a tungsten salt, a molybdenum salt and basic nickel carbonate in an aqueous solution, followed by a sulfidation process. During the reaction, at least part of the metallic components was ensured to be existed in the solid form. In the patent, part of the raw materials used is basic nickel carbonate, which is insoluble in water, the essential reaction during the syntheses is an exchange reaction between the ions and solid. Thus, it was hard to prepare catalyst particles with small grains.

It is obviously found from the prior art that the preparation methods of the multi-metal bulk catalysts have the disadvantages of:

(1) the raw materials used are not friendly on the environment;

(2) The preparation costs of the catalysts are relatively high; and (3) The activities of the catalysts needs to be further improved.

Thus, it is greatly desired to develop a multi-metallic bulk hydrodesulfurization catalyst and a method for the preparation thereof, wherein the catalyst has super high activity which starting materials are facile, and the catalyst are friendly on the environment and the cost thereof are relative.

SUMMARY OF THE INVENTION

An objective of the invention is to provide a multi-metallic bulk catalyst with layered structure having high activity.

Another objective of the invention is to provide a method for the preparation of the above catalyst.

In order to achieve the above objectives, the invention, in one aspect, provides a multi-metallic bulk catalyst with layered bulk structure, wherein the metals in the multi-metallic bulk catalyst is consisted of a Group VIII metal $M_I$, at least one metal $M_{II}$ with the valence of +3 and at least two Group VIB metals $M_{III}+M_{IV}$, wherein (the mole number of $M_I$+the mole number of $M_{II}$):(the mole number of $M_{III}$+the mole number of $M_{IV}$) is from 1:9 to 9:1; the mole number of $M_1$:the mole number of $M_{II}$ is from 1:5 to 5:1; the mole number of $M_{III}$:the mole number of $M_{IV}$ is from 1:5 to 5:1.

In one preferable aspect of the invention, $M_{II}$ is selected from Cr, Al or Co; $M_I$ is selected from Ni; and one of $M_{III}$ and $M_{IV}$ is Mo and the other is W.

In another preferable aspect of the invention, (the mole number of $M_I$+the mole number of $M_{II}$):(the mole number of $M_{III}$+the mole number of $M_{IV}$) is from 1:3 to 3:1; the mole number of $M_I$:the mole number of $M_{II}$ is from 1:2 to 2:1; the mole number of $M_{III}$: the mole number of $M_{IV}$ is from 1:2 to 2:1.

The invention, in another aspect, provides a process for the preparation of the above catalyst, comprising the steps of: (1) heating a solution of soluble salts containing anion groups of the at least two Group VIB metals, a mixed solvent of water and an organic solvent, and a surfactant to 50-150° C. under stirring, wherein the concentrations of the anions of the at least two Group VIB metals in the solution is 0.02-0.2 mol/L, respectively, and the concentration of the surfactant in the solution is 1-5 wt %; (2) adding a slurry of a catalyst precursor with layered structure into the solution of the step (1) to obtain a solid product, wherein in the slurry of a catalyst precursor with layered structure, the catalyst precursor with layered structure has a concentration of 0.1-0.9 mol/L, which is prepared by mixing an aqueous solution of a soluble salt of the Group VIII metal and an aqueous solution of a soluble salt of the metal with the valence of +3, and heating to 50-150° C. to form the catalyst precursor with layered structure, wherein in the aqueous solution of the soluble salt of the Group VIII metal, the soluble salt of the Group VIII metal has a concentration of 0.01-0.1 mol/L, and in the aqueous solution of the soluble salt of the metal with the valence of +3, the soluble salt of the metal with the valence of +3 has a concentration of 0.01-0.1 mol/L; and (3) filtering, washing and drying the solid product obtained in the step (2).

In one preferable aspect, the soluble salt of the Group VIII metal comprises one selected from the group consisting of nickel nitrate, nickel acetate, nickel sulfate and nickel chloride.

In another preferable aspect, the soluble salt of the metal with the valence of +3 comprises one selected from the group consisting of aluminium nitrate, aluminium chloride, aluminium acetate, chromium nitrate, chromium chloride, chromium acetate, cobalt nitrate, cobalt chloride and cobalt acetate.

In a further preferable aspect, the soluble salts containing anion groups of the at least two Group VIB metals comprise one selected from the group consisting of ammonium molybdate and sodium molybdate, and one selected from the group consisting of ammonium tungstate, ammonium metatungstate and sodium tungstate.

In one preferable aspect, the surfactant is hexadecyltrimethylammonium bromide, hexadecyltrimethylammonium chloride, octadecyltrimethylammonium bromide, or octadecyltrimethylammonium chloride.

The invention, in a further aspect, provides use of the above catalyst in hydrodesulfurization reaction of fuels having organic sulfur-containing compounds.

In one preferable aspect, the conditions for the hydrodesulfurization reaction are: a temperature of from 280 to 400° C., a pressure of hydrogen of from 1 to 20 MPa, a ratio by volume of hydrogen to the fuels having organic sulfur-containing compounds of from 50 to 1000, and a weight hourly space velocity of the raw materials of from 0.1 to 10 $h^{-1}$.

In another preferable aspect, the catalyst, prior to the hydrodesulfurization reaction, is pre-treated by (a) pulverizing, kneading and molding; and (b) pre-sulfurizing in situ in a hydrodesulfurization fixed-bed reactor at 300 to 450° C., with a mixed gas of a sulfur-containing compound and hydrogen.

In a further preferable aspect, the sulfur-containing compound is hydrogen sulfide, carbon disulfide or dimethyl disulfide.

Compared with the known technologies, this invention has the advantages of:

1) The multi-metallic bulk catalyst with layered structure is prepared by using a layered structure compound as a precursor for synthesizing the catalyst, wherein the preparation process is easy to operate, it is friendly on the environment, and the catalyst can be produced in the industrial scale.

2) The catalyst synthesized by this invention exhibits characteristics such as a relatively high distribution degree, a specific layered structure, and the like so as to ensure sufficient contact between the active metals, which leads to form more active sites.

3) The cost of the catalyst is reduced by introducing the cheap metals with the valence of +3 (such as chromium, aluminium, and the like) thereto.

4) The catalyst in this invention exhibits a super high hydrodesulfurization activity in the ultra-deep hydrodesulfurization of sulfur-containing compounds, wherein under mild operating conditions, the sulfur level in diesel distillate can be reduced from 500 ppm to less than 30 ppm, achieving the objective of ultra-deep hydrodesulfurization.

5) A layered structure can be detected in the catalyst in this invention, upon characterizations of the catalyst by XRD. After the ion-exchange reaction, the active metal species are exchanged into the galleries of the layer sheets successfully, thus the more uniform distribution of the active metals and the more active sites are formed, which lead to the catalyst having extreme high hydrodesulfurization activity.

DETAILED DESCRIPTION OF THE PRESENTLY PREFERRED EMBODIMENTS

Figure 1:
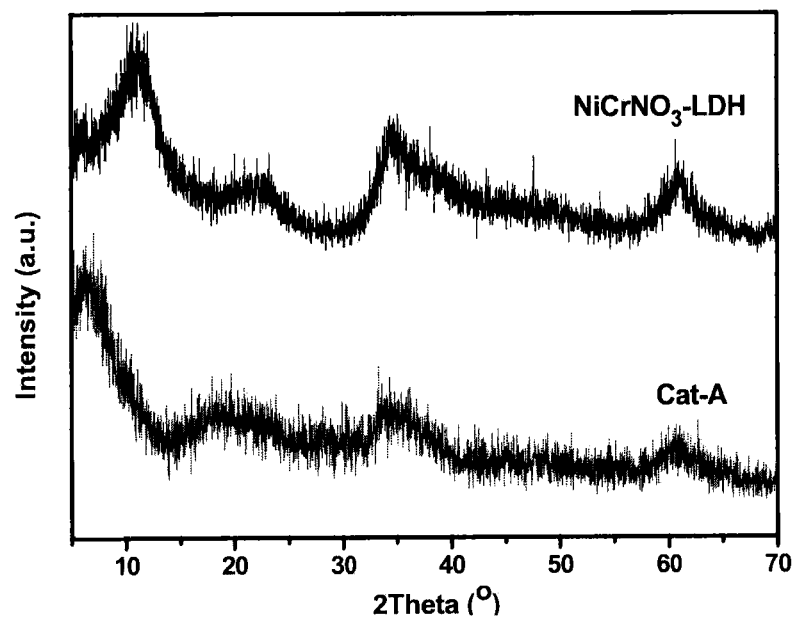
FIG. 1 is the XRD patterns of the NiCr-LDH catalyst precursor with layered structure as prepared according to Example 1 and the Cat-A catalyst.

This invention is a multi-metallic bulk catalyst based on layered structure, which formed from a Group VIII metal $M_I$, at least one metal $M_{II}$ with the valence of +3, and at least two Group VIB metals ($M_{III}$ and $M_{IV}$), wherein the ratio of the sum of the mole numbers of the Group VIII metal and the at least one metal with the valence of +3 ($M_I+M_{II}$) to the sum of the mole numbers of at least two Group VIB metals ($M_{III}+M_{IV}$) is from 1:9 to 9:1, preferably from 1:6 to 6:1, and more preferably from 1:3 to 3:1; the molar ratio of the Group VIII metal $M_I$ to the metal $M_{II}$ with the valence of +3 is from 1:5 to 5:1, preferably from 1:3 to 3:1, and more preferably from 1:2 to 2:1; and the molar ratio of the 2 Group VIB metals $M_{III}$ to $M_{IV}$ is from 1:5 to 5:1, preferably from 1:3 to 3:1, and more preferably from 1:2 to 2:1.

The metal with the valence of +3 is selected from Cr, Al or Co; the Group VIII metal is selected from Ni, and the Group VIB metals are selected from the Mo and W.

This invention is a bulk catalyst obtained by anion-exchange reaction based on the layered structure, which is a bulk catalyst with layered structure formed from NiAlMoW, NiCrMoW or NiCoMoW multi-metals. The anion groups of the two group VIB metals are exchanged via ion-exchange reaction into the galleries of layer sheets of the catalyst, which lead to the high distribution of the active metals and the more active sites being formed.

The preparation method of the catalyst in the invention is explained briefly as follows:

a) obtaining a catalyst precursor with layered structure by co-precipitation reaction between an aqueous solution of a soluble salt of the group VIII metal and an aqueous solution of a soluble salt of the metal with the valence of +3; and b) performing an anion-exchange reaction between a slurry of the catalyst precursor with layered structure and the soluble salts of the anion groups of the at least two group VIB metals in a mixed solution of a surfactant, water and an organic solvent.

In detail, the preparation method of the catalyst in the invention comprises the steps of:

a) adding a soluble salt of the Group VIII metal into water to form an aqueous solution having a salt concentration of from 0.01 to 0.1 mol/L, and adding a soluble salt of the metal with the valence of +3 into water to form an aqueous solution having a salt concentration of from 0.01 to 0.1 mol/L, and then mixing the two aqueous solutions and heating to a temperature of 50 to 150° C., to synthesize a catalyst precursor with layered structure via a co-precipitation reaction;

b) adding the catalyst precursor with layered structure into water to form a slurry having a concentration of from 0.1 to 0.9 mol/L;

c) adding soluble salts containing anion groups of the two Group VIB metals into a mixed solvent of water and an organic solvent to form a solution having a metal ion concentration of from 0.02 to 0.2 mol/L, and adding a surfactant thereto such that the concentration of the surfactant in the solution is from 1 to 5 wt %, and heating the solution to a temperature from 50 to 150° C. under stirring;

d) adding the slurry of the catalyst precursor with layered structure in step b) into the solution in step e), and adjusting the pH value of the reaction system by using 0.2 mollL dilute nitric acid solution and aqueous ammonia, and reacting them under reflux at 50 to 150° C. for 4 to 10 hours; and e) filtering, washing and drying the product obtained in step d) to obtain the target product.

In the preparation method of the invention, the soluble salt of the Group VIII metal comprises one or a combination selected from the group consisting of nickel nitrate, nickel acetate, nickel sulfate and nickel chloride, preferably nickel nitrate and nickel acetate, and more preferably nickel nitrate. The soluble salt of the at least one metal with the valence of +3 comprises one selected from the group consisting of aluminium nitrate, aluminium chloride, aluminium acetate, aluminium sulfate, chromium nitrate, chromium chloride, chromium acetate, chromium sulfate, cobalt nitrate, cobalt sulfate, cobalt chloride and cobalt acetate, preferably aluminium nitrate, aluminium acetate, chromium nitrate, chromium acetate, cobalt nitrate and cobalt chloride, and more preferably aluminium nitrate, chromium nitrate and cobalt nitrate. The salts the group VIB metals comprise ammonium molybdate, ammonium tungstate, ammonium metatungstate, sodium molybdate, or sodium tungstate, and preferably ammonium molybdate, ammonium tungstate, or ammonium metatungstate.

The surfactant in the invention is hexadecyltrimethylammonium bromide, hexadecyltrimethylammonium chloride, octadecyltrimethylammonium bromide, or octadecyltrimethylammonium chloride.

The catalyst in invention can be used in hydrodesulfurization reaction of fuels with organic sulfur-containing compounds. In the hydrodesulfurization reaction, the reaction temperature is from 280 to 400° C., the pressure of hydrogen is from 1 to 20 MPa, the ratio by volume of hydrogen to the diesel distillate is from 50 to 1000, and the weight hourly space velocity of the raw materials is from 0.1 to 10 $h^{-1}$.

Prior to the hydrodesulfurization reaction, the catalyst in the invention should be pre-treated as follows:

(a) pulverizing, kneading and molding; and (b) sulfurizing in situ in a hydrodesulfurization fixed-bed reactor at 300 to 450° C. with a mixed gas of a sulfur-containing compound (hydrogen sulfide, carbon disulfide or dimethyl disulfide) and hydrogen.

The NiCrMoW catalyst can be detected to have layered structure, upon characterizations of the catalyst by XRD. The increase of the distance between the layers after the exchange of the anions of Mo and W demonstrates that the active metal species Mo and W are exchanged into the galleries of the layer sheets successfully. So there are more active sites formed in the catalyst.

FIG. 1 is the XRD patterns of the NiCr-LDH catalyst precursors with layered structure as prepared according to Example 1 and the Cat-A catalyst. It can be found that there is a characteristic peak at about 11° due to the diffraction of the (003) plane of NiCr-LDH, which peak may correspond to the distance between the neighbouring layer sheets of the layered structure. After the anion-exchange reaction, it is found that this peak shifts to the lower diffraction angle direction in the Cat-A catalyst, which appears at about 6°. We find via calculation that the distance between layers is increased from 7.6 Å to 14.2 Å, which suggests that the distance between the layer sheets is expanded by the anion groups containing Mo and W active metals. Through the result of XRD characterization, it can be concluded that the NiCr-LDH catalyst precursor with layered structure has been prepared successfully and further, the Mo and W active metals are successfully exchanged into the galleries of the layers via anion-exchange reaction, which lead to form the bulk catalyst with highly dispersed active species. Furthermore, the cost of the catalyst is reduced by introducing the cheap metal with the valence of +3 thereto.

Figure 2:
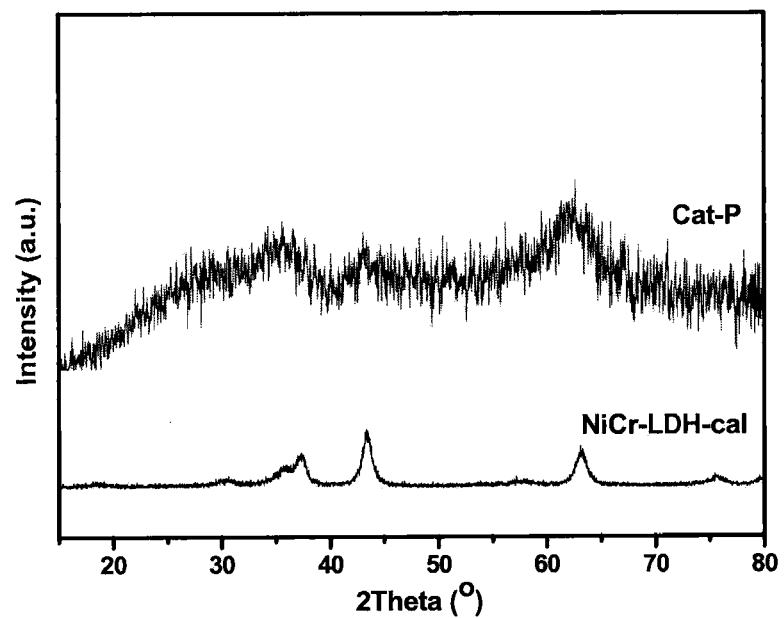
FIG. 2 is the XRD patterns of the calcined NiCr-LDH catalyst with layered structure as prepared according to Example 1 and the Cat-P catalyst.

FIG. 2 is the XRD patterns of the calcined NiCr-LDH catalyst with layered structure as prepared according to Example 1 and the Cat-P catalyst, as described in Example 16. It can be observed that there are mainly NiO characteristic peaks in the NiCr-LDH catalyst after calcinations. However, a broader characteristic peak is appeared in Cat-P calcined catalyst.

Figure 3:
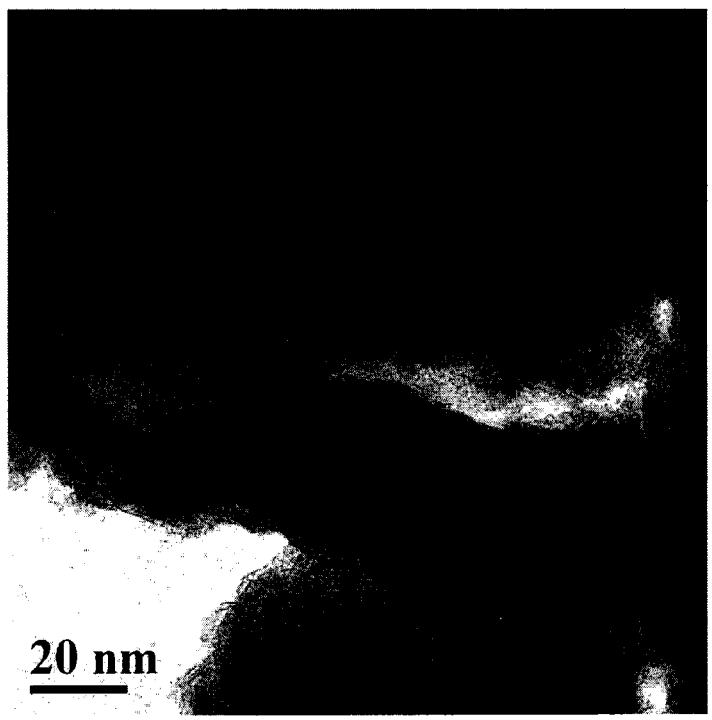
FIG. 3 is the TEM images of the Cat-A catalyst, after sulfidation, as prepared in Example 1, wherein (a) and (b) are TEM images of the different areas of the catalyst.
Figure 3:
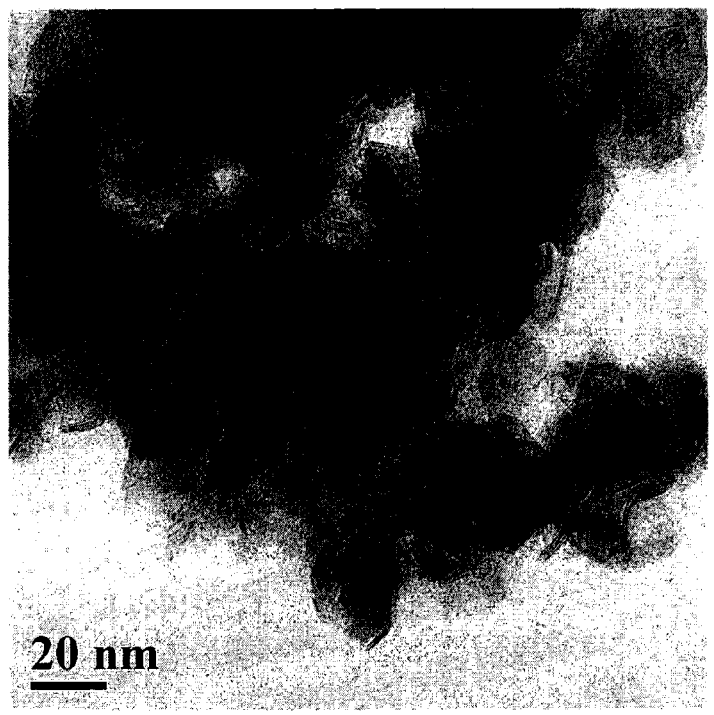

FIG. 3 is the TEM images of the Cat-A catalyst, after pre-sulfidation, as prepared in Example 1. In image (b), fringes of basal plane assigned to sulfide could be observed.

While in image (a), broad fringes assigned to the compound with layered structure could also be observed. The sulfide catalyst is highly dispersed.

EXAMPLES

The following examples are provided for purpose of further illustrating the invention, but are not intended to limit the scope of the invention as defined in the attached claims. For example, the multi-metal bulk catalyst that formed one Group VIII metal, one metal with the valence of +3 and at least two Group VIB metals can be prepared according to the experimental results of this invention, wherein the metal with the valence of +3 is selected from the group consisting of Cr, Al and Co, the Group VIII metal is selected from Ni and the Group VIB metals are selected from the group consisting of Mo and W. Here, for the purpose of concision, the examples of NiCrMoW and NiAlMoW are given only, which are not suggested that the invention could not be realized by the remaining metals mentioned above.

Example 1

Preparation of Nicrmow Bulk Catalyst in the Invention a) Nickel nitrate (29.08 g, 0.1 mol $Ni^{2+}$) and chromium nitrate (20.01 g, 0.05 mol $Cr^{3+}$) were weighed, respectively, and dissolved into 200 ml water to form an aqueous solution. Then 0.2 mol/L aqueous NaOH solution was added dropwise thereto to adjust the pH value to 12. It was heated to a reaction temperature of 80° C. to form a mixed reaction liquid with grayish green color, and reacted at the reaction temperature under reflux for 25 hours to obtain a grayish green product. The grayish green product obtained through the reaction was filtered and washed to obtain a catalyst precursor (that is, NiCr-LDH precursor with layered structure). Then, the catalyst precursor was added into 200 ml water to form a slurry of the precursor (a).

b) Ammonium molybdate (1.77 g, 0.01 mol $Mo^{6+}$) and ammonium metatungstate (2.46 g, 0.01 mol $W^{6+}$) were weighed, respectively, and dissolved in a mixture of water (30 ml), ethylene glycol (100 ml) and hexadecyltrimethylammonium chloride (0.5 g) to form a solution, which was heated to a reaction temperature of 80° C. under continuous stirring to form a colourless transparent solution (b). The slurry of the precursor (a) (60 ml, 0.03 mol $Ni^{2+}$) made in step a) was measured out and heated to the reaction temperature. The slurry was added into the colourless transparent solution (b) slowly to form a grayish green reaction liquid, which was reacted at the reaction temperature for 5 hours under reflux to obtain grayish green powders. The grayish green powders obtained in the reaction were filtered, washed and dried at 120° C. to obtain a NiCrMoW catalyst (7.9 g).

c) The catalyst was in the form of grayish green powders with the formula of $Cr_2O_3 \cdot 4NiO \cdot MoO_3 \cdot WO_3$ detected by XRF. The catalyst synthesized in the Example was denoted as Cat-A. The XRD patterns of the catalyst were shown in FIG. 1. Before performing hydrodesulfurization reaction, the catalyst was pre-sulfided under a sulfidation condition of reacting at 400° C. for 2 hours in an atmosphere of 10% $H_2S/H_2$, wherein the flow rate of 10% $H_2S/H_2$ was 60 ml/min.

After the pre-sulfidation, the Cat-A catalyst was characterized by TEM and the TEM images were shown in FIG. 3. In image (b), the dispersed uniformly fringes of the sulfide facets could be observed obviously which suggested that the Cat-A catalyst exhibited a relatively high distribution degree.

Example 2

The multi-metallic bulk catalyst denoted as Cat-B (7.2 g) was prepared by the same method as described in Example 1 except that nickel nitrate (26.17 g, 0.09 mol $Ni^{2+}$) and chromium nitrate (12.01 g, 0.03 mol $Cr^{3+}$) were used instead of nickel nitrate (29.08 g, 0.1 mol $Ni^{2+}$) and chromium nitrate (20.01 g, 0.05 mol $Cr^{3+}$) used in Example 1; and the slurry of the precursor (a) (67.7 ml, 0.03 mol $Ni^{2+}$) prepared in step a) which was measured in step b) was used instead of the slurry of the precursor (a) (60 ml, 0.03 mol $Ni^{2+}$) prepared in step a) which was measured in step b) used in Example 1. the Cat-B had a similar morphology to that of Cat-A.

Example 3

The multi-metallic bulk catalyst denoted as Cat-C (7.0 g) was prepared by the same method as described in Example 1 except that nickel nitrate (8.72 g, 0.03 mol $Ni^{2+}$) and chromium nitrate (36.03 g, 0.09 mol $Cr^{3+}$) were used instead of nickel nitrate (29.08 g, 0.1 mol $Ni^{2+}$) and chromium nitrate (20.01 g, 0.05 mol $Cr^{3+}$) used in Example 1; and the slurry of the precursor (a) (133 ml, 0.02 mol $Ni^{2+}$) prepared in step a) which was measured in step b) was used instead of the slurry of the precursor (a) (60 ml, 0.03 mol $Ni^{2+}$) prepared in step a) which was measured in step b) used in Example 1. The Cat-C catalyst was in the form of blue green powders.

Example 4

The multi-metallic bulk catalyst denoted as Cat-D (12.7 g) was prepared by the same method as described in Example 1 except that ammonium molybdate (1.77 g, 0.01 mol $Mo^{6+}$) and ammonium metatungstate (7.38 g, 0.03 mol $W^{6+}$) were used instead of ammonium molybdate (1.77 g, 0.01 mol Mon and ammonium metatungstate (2.46 g, 0.01 mol $W^{6+}$) used in Example 1. The Cat-D catalyst was in the form of grayish green powders.

Example 5

The multi-metallic bulk catalyst denoted as Cat-E (10.2 g) was prepared by the same method as described in Example 1 except that ammonium molybdate (5.31 g, 0.03 mol $Mo^{6+}$) and ammonium metatungstate (2.46 g, 0.01 mol $W^{6+}$) instead of ammonium molybdate (1.77 g, 0.01 mol $Mo^{6+}$) and ammonium metatungstate (2.46 g, 0.01 mol $W^{6+}$) used in Example 1. the Cat-E catalyst was in the form of grayish green powders.

Example 6

The multi-metallic bulk catalyst denoted as Cat-F (14.5 g) was prepared by the same method as described in Example 1 except that the slurry of the precursor (a) (160 ml, 0.08 mol $Ni^{2+}$) prepared in step a) which was measured in step b) was used instead of the slurry of the precursor (a) (60 ml, 0.03 mol $Ni^{2+}$) prepared in step a) which was measured in step b) used in Example 1. The catalyst Cat-F was in the form of grayish green powders.

Example 7

The multi-metallic bulk catalyst denoted as Cat-G (30.1 g) was prepared by the same method as described in Example 1 except that ammonium molybdate (15.93 g, 0.09 mol $Mo^{6+}$) and ammonium metatungstate (22.14 g, 0.09 mol $W^{6+}$) were used instead of ammonium molybdate (1.77 g, 0.01 mol Mon and ammonium metatungstate (2.46 g, 0.01 mol $W^{6+}$) used in Example 1; and the slurry of the precursor (a) (40 ml, 0.02 mol $Ni^{2+}$) prepared in step a) which was measured in step b) was used instead of the slurry of the precursor (a) (60 ml, 0.03 mol $Ni^{2+}$) prepared in step a) which was measured in step b) used in Example 1. The Cat-E catalyst was in the form of grayish green powders.

Example 8

The multi-metallic bulk catalyst denoted as Cat-H (7.3 g) was prepared by the same method as described in Example 1 except that the reaction was performed at 50° C. for 10 hours in step a) instead of at 80° C. for 25 hours in step a) used in Example 1. The Cat-H catalyst was in the form of grayish green powders.

Example 9

The multi-metallic bulk catalyst denoted as Cat-I (7.6 g) was prepared by the same method as described in Example 1 except that the reaction was performed at 50° C. for 25 hours in step a) instead of at 80° C. for 25 hours in step a) used in Example 1. The Cat-I catalyst was in the form of grayish green powders.

Example 10

The multi-metallic bulk catalyst denoted as Cat-J (6.9 g) was prepared by the same method as described in Example 1 except that the reaction was performed at 150° C. for 10 hours in step a) instead of at 80° C. for 25 hours in step a) used in Example 1. The Cat-J catalyst was in the form of grayish green powders.

Example 11

The multi-metallic bulk catalyst denoted as Cat-K (7.4 g) was prepared by the same method as described in Example 1 except that the reaction was performed at 150° C. for 25 hours in step a) instead of at 80° C. for 25 hours in step a) used in Example 1. the Cat-K catalyst was in the form of grayish green powders.

Example 12

The multi-metallic bulk catalyst denoted as Cat-L (7.3 g) was prepared by the same method as described in Example 1 except that the reaction was performed at 50° C. for 4 hours in step b) instead of at 80° C. for 5 hours in step b) used in Example 1. The Cat-L catalyst was in the form of grayish green powders.

Example 13

The multi-metallic bulk catalyst denoted as Cat-M (7.9 g) was prepared by the same method as described in Example 1 except that the reaction was performed at 50° C. for 10 hours in step b) instead of at 80° C. for 5 hours in step b) used in Example 1. The Cat-M catalyst was in the form of grayish green powders.

Example 14

The multi-metallic bulk catalyst denoted as Cat-N (7.8 g) was prepared by the same method as described in Example 1 except that the reaction was performed at 150° C. for 4 hours in step b) instead of at 80° C. for 5 hours in step b) used in Example 1. The Cat-N catalyst was in the form of grayish green powders.

Example 15

The multi-metallic bulk catalyst denoted as Cat-O (7.8 g) was prepared by the same method as described in Example 1 except that the reaction was performed at 150° C. for 10 hours in step b) instead of at 80° C. for 5 hours in step b) used in Example 1. The Cat-O catalyst was in the form of grayish green powders.

Example 16

The multi-metallic bulk catalyst denoted as Cat-P (6.7 g) was prepared by the same method as described in Example 1 except that the catalyst was calcined at 400° C. for 2 hours at air atmosphere before the hydrodesulfurization reaction and the pre-sulfidation. The Cat-P catalyst was in the form of brown powders. The XRD patterns of the catalyst were shown in FIG. 2.

Example 17

Preparation of NiAlMoW Bulk Catalyst in the Invention a) Nickel nitrate (29.08 g, 0.1 mol $Ni^{2+}$) and aluminium nitrate (18.8 g, 0.05 mol $Al^{3+}$) were weighed, respectively, and dissolved into 200 ml water to form an aqueous solution. Then 0.2 mol/L aqueous NaOH solution was added dropwise thereto adjust the pH value to 12. It was heated to a reaction temperature of 80° C. to form a mixed reaction liquid with grayish green color, and react at the reaction temperature under reflux for 25 hours to obtain a grayish green powders. The grayish green powders were filtered and washed to obtain a catalyst precursor (that is, NiAl-LDH precursor with layered structure). Then, the catalyst precursor was added into 200 ml water to form a slurry of the precursor (a).

b) Ammonium molybdate (1.77 g, 0.01 mol $Mo^{6+}$) and ammonium metatungstate (2.46 g, 0.01 mol $W^{6+}$) were weighed, respectively, and dissolved in a mixture of water (30 ml), ethylene glycol (100 ml) and hexadecyltrimethylammonium chloride (0.5 g) to form a solution, which was heated to a reaction temperature of 80° C. under continuous stirring to form a colourless transparent solution (b). The slurry of the precursor (a) (60 ml, 0.03 mol $Ni^{2+}$) made in step a) was measured out and heated to the reaction temperature. The slurry was added into the colourless transparent solution slowly to form a grayish green reaction liquid, which was reacted at the reaction temperature for 5 hours under reflux to obtain grayish green powders. The grayish green powders obtained in the reaction were filtered, washed and dried at 120° C. to obtain a NiCrMoW catalyst (7.2 g).

c) The catalyst was in the form of grayish green powders with the formula of $Al_2O_3.4.5NiO.1.3MoO_3.WO_3$ detected by XRF. The catalyst synthesized in the Example was denoted as Cat-Q. Before performing hydrodesulfurization reaction, the catalyst was pre-sulfided under a sulfidation condition of reacting at 400° C. for 2 hours in an atmosphere of 10% $H_2S/H_2$, wherein the flow rate of 10% $H_2S/H_2$ was 60 ml/min.

Example 18

Evaluation of the Performance of the Catalysts in Hydrodesulfurization Reaction

The performances of the catalysts were evaluated in a fixed-bed reactor for the hydrodesulfurization of diesel distillate (in which 4,6-DMDBT was dissolved in decalin) having a sulfur content of 500 ppm. The reaction conditions are as follows: 1 g of the catalyst, a reaction temperature of 300° C., a hydrogen pressure of 3.0 MPa, a ratio of $H_2$ to diesel distillate of 800 $Nm^3H_2/m^3$ diesel distillate, and a weight hourly space velocity of 9 $h^{-1}$. The sulfur content in the samples was determined by Antek total sulfur analyzer.

In the above hydrodesulfurization reactions of diesel distillate, the reactions were performed by using the catalysts of the invention, wherein it was found that Cat-A and Cat-Q have the highest hydrodesulfurization effect, wherein the Cat-A catalyst reduced the sulfur content in the raw material from 500 ppm to 34 ppm, and the Cat-Q catalyst reduced the sulfur content in the raw material from 500 ppm to 20 ppm.

The sulfur contents of the diesel distillate after performing hydrodesulfurization were listed in Table 1.

TABLE 1

Comparison of performances of the catalysts in the hydrodesulfurization reaction

| Catalyst | Sulfur Content in the product (ppm) | Specific Activity |
|---|---|---|
| Cat-A | 34 | 339 |
| Cat-B | 44 | 275 |
| Cat-C | 65 | 198 |
| Cat-D | 37 | 317 |
| Cat-E | 40 | 297 |
| Cat-F | 69 | 187 |
| Cat-G | 36 | 324 |
| Cat-H | 50 | 248 |
| Cat-I | 42 | 286 |
| Cat-J | 41 | 292 |
| Cat-K | 37 | 317 |
| Cat-L | 45 | 270 |
| Cat-M | 35 | 331 |
| Cat-N | 36 | 324 |
| Cat-O | 34 | 339 |
| Cat-P | 105 | 126 |
| Cat-Q | 20 | 507 |
| Commercial Reference Catalyst | 130 | 100 |

The commercial reference catalyst was supplied by SINOPEC having a composition of $CO_3O_4.2.2NiO.5.9MoO_3.2WO_3$.

The activity of the catalysts prepared in the invention was expressed by a specific activity. That is, the specific activity of a catalyst in the invention was expressed by a value obtained by comparing the activity of the catalyst in the invention with that of the reference catalyst, wherein the activity of the reference catalyst when it was operated for 200 hours was defined as 100. The specific hydrodesulfurization activity was calculated by the following equation:

The specific hydrodesulfurization activity=$100\times[(1/S)^{0.65}-(1/S_f)^{0.65}]/[(1/S_{pr})^{0.65}-(1/S_{fr})^{0.65}]$ Where, $S_{fr}$ and $S_{pr}$ stand for the sulfur contents in the diesel distillate and in the product treated through hydrodesulfurization by using the reference catalyst, respectively; while $S_f$ and $S_p$ stand for the sulfur contents in the diesel distillate and in the product treated through hydrodesulfurization by using catalysts in the invention, respectively.

In summary, a multi-metallic bulk catalyst with high hydrodesulfurization activity has been prepared in the invention, which is a kind of catalyst with layered structure and with a relatively high distribution degree of the active metals which is exchanged into the galleries of layer sheets. There are more active sites in the catalyst. The sulfur content in the diesel distillate which includes 4,6-DMDBT could be reduced from 500 ppm to 20 ppm through hydrodesulfurization under the mild operating conditions. Thus ultra-deep hydrodesulfurization is achieved. Furthermore, the cost of catalyst has been reduced by introducing the cheap metal with the valence of +3 (such as, Al, Cr, and the like) into the catalyst. Thus, the catalyst in the invention shows a significant potential application in industry.

What is claimed is:

1. A multi-metallic bulk catalyst with layered structure, wherein the metals in the multi-metallic bulk catalyst is consisted of Ni, Al, Mo, and W, wherein:
    (the mole number of Ni+the mole number of Al):(the mole number of Mo+the mole number of W) is from 1:9 to 9:1;
    the mole number of Ni:the mole number of Al is from 1:5 to 5:1;
    the mole number of Mo:the mole number of W is from 1:5 to 5:1; and
    the multi-metallic bulk catalyst exists in a form of oxide.

2. The multi-metallic bulk catalyst according to claim 1 wherein (the mole number of Ni+the mole number of Al):(the mole number of Mo+the mole number of W) is from 1:3 to 3:1; the mole number of Ni:the mole number of Al is from 1:2 to 2:1; the mole number of Mo:the mole number of W is from 1:2 to 2:1.

3. A process for preparing the multi-metallic bulk catalyst according to claim 1, comprising the steps of:
    1) heating a solution of soluble salts containing anion groups of the at least two Group VIB metals of molybdenum and tungsten, a mixed solvent of water and an organic solvent, and a surfactant to 50-150° C. under stirring, wherein the concentrations of the anions of the at least two Group VIB metals in the solution is 0.02-0.2 mol/L, respectively, and the concentration of the surfactant in the solution is 1-5 wt %; and
    2) adding a slurry of a catalyst precursor with layered structure into the solution of the step 1) to obtain a solid product, wherein in the slurry of a catalyst precursor with layered structure, the catalyst precursor with layered structure has a concentration of 0.1-0.9 mol/L, which is prepared by mixing an aqueous solution of a soluble salt of the Group VIII metal nickel and an aqueous solution of a soluble salt of the metal with the valence of +3 of aluminum, and heating to 50-150° C. to form the catalyst precursor with layered structure, wherein in the aqueous solution of the soluble salt of the Group VIII metal, the soluble salt of the Group VIII metal has a concentration of 0.01-0.1 mol/L, and in the aqueous solution of the soluble salt of the metal with the valence of +3, the soluble salt of the metal with the valence of +3 has a concentration of 0.01-0.1 mol/L.

4. The process according to claim 3 wherein the soluble salt of the Group VIII metal comprises one selected from the group consisting of nickel nitrate, nickel acetate, nickel sulfate and nickel chloride;
the soluble salt of the metal with the valence of +3 comprises one selected from the group consisting of aluminium nitrate, aluminium chloride, and aluminium acetate;
the soluble salts containing anion groups of the at least two Group VIB metals comprise one selected from the group consisting of ammonium molybdate and sodium molybdate, and one selected from the group consisting of ammonium tungstate, ammonium metatungstate and sodium tungstate.

5. The process according to claim 3 wherein the surfactant is hexadecyltrimethylammonium bromide, hexadecyltrimethylammonium chloride, octadecyltrimethylammonium bromide, or octadecyltrimethylammonium chloride.

6. A process of using the multi-metallic bulk catalyst according to claim 1 comprising contacting the catalyst of claim 1 with hydrogen and fuels having organic sulfur-containing compounds thus hydrodesulfurizing said fuels under a condition for hydrodesulfurization reaction.

7. The process according to claim 6 wherein the conditions for the hydrodesulfurization reaction are: a temperature of from 280 to 400° C., a pressure of hydrogen of from 1 to 20 MPa, a ratio by volume of hydrogen to the fuels having organic sulfur-containing compounds of from 50 to 1000, and a weight hourly space velocity of the raw materials of from 0.1 to 10 $h^{-1}$.

8. The process according to claim 6 wherein, the catalyst, prior to the hydrodesulfurization reaction, is pre-treated by:
a) pulverizing, kneading and molding; and
b) pre-sulfurizing in situ in a hydrodesulfurization fixed-bed reactor at 300 to 450° C. with a mixed gas of a sulfur-containing compound and hydrogen.

9. The process according to claim 6 wherein the sulfur-containing compound is hydrogen sulfide, carbon disulfide or dimethyl disulfide.

* * * * *